United States Patent
Jankovic et al.

(10) Patent No.: US 9,677,666 B2
(45) Date of Patent: Jun. 13, 2017

(54) TRANSMISSION SHIFT SCHEDULE OPTIMIZATION BASED ON CALCULATED SPECIFIC FUEL CONSUMPTION

(71) Applicant: Ford Global Technologies, LLC, Dearborn, MI (US)

(72) Inventors: Mrdjan J. Jankovic, Birmingham, MI (US); David G. Hagner, Beverly Hills, MI (US); Stephen Lee Cooper, Hamtramck, MI (US); Zhengyu Dai, Canton, MI (US); Guopeng Hu, Northville, MI (US); Hong Jiang, Birmimgham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 14/689,217

(22) Filed: Apr. 17, 2015

(65) Prior Publication Data
US 2016/0305540 A1 Oct. 20, 2016

(51) Int. Cl.
*F16H 59/34* (2006.01)
*F16H 61/02* (2006.01)
*F16H 59/74* (2006.01)
*F16H 61/00* (2006.01)
*F16H 59/36* (2006.01)

(52) U.S. Cl.
CPC ......... *F16H 59/34* (2013.01); *F16H 61/0213* (2013.01); *F16H 59/74* (2013.01); *F16H 2059/366* (2013.01); *F16H 2061/0015* (2013.01); *F16H 2061/0216* (2013.01)

(58) Field of Classification Search
None
See application file for complete search history.

(56) References Cited

U.S. PATENT DOCUMENTS

| | | | |
|---|---|---|---|
| 6,496,767 B1* | 12/2002 | Lorentz | F16H 61/0213 123/443 |
| 8,340,884 B1 | 12/2012 | He et al. | |
| 2009/0118092 A1* | 5/2009 | Doering | F02D 41/023 477/107 |
| 2010/0036571 A1 | 2/2010 | Han et al. | |
| 2011/0130931 A1* | 6/2011 | Yoshikawa | F16H 61/0213 701/55 |
| 2013/0184949 A1* | 7/2013 | Saito | B60W 10/11 701/58 |
| 2013/0297162 A1* | 11/2013 | Dai | B60W 20/30 701/55 |
| 2015/0088392 A1* | 3/2015 | Yu | F16H 61/68 701/58 |
| 2015/0120156 A1* | 4/2015 | Leim | F16H 61/688 701/59 |

(Continued)

*Primary Examiner* — Jacob S Scott
(74) *Attorney, Agent, or Firm* — James Dottavio; Brooks Kushman P.C.

(57) ABSTRACT

A vehicle includes a transmission and a controller. The controller is configured to receive a torque request, calculate a Specific Fuel Consumption (SFC) for satisfying the torque request in an initial gear and in an alternate gear, and command the transmission to shift from the initial gear into the alternate gear in response to the calculated SFC for satisfying the torque request in the alternate gear being less than the calculated SFC for satisfying the torque request in the initial gear.

11 Claims, 3 Drawing Sheets

(56) References Cited

U.S. PATENT DOCUMENTS

| | | | |
|---|---|---|---|
| 2015/0367840 A1* | 12/2015 | Yang | B60W 20/30 |
| | | | 701/22 |
| 2016/0047464 A1* | 2/2016 | Tokura | F16H 61/0213 |
| | | | 701/58 |
| 2016/0084374 A1* | 3/2016 | Kim | F16H 61/68 |
| | | | 701/51 |

* cited by examiner

TRANSMISSION SHIFT SCHEDULE OPTIMIZATION BASED ON CALCULATED SPECIFIC FUEL CONSUMPTION

TECHNICAL FIELD

This disclosure relates to the field of automatic transmissions for motor vehicles. More particularly, the disclosure pertains to a system and method of scheduling shifting between gear ratios of the transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY

A vehicle according to the present disclosure includes a transmission and a controller. The controller is configured to receive a torque request, calculate a Specific Fuel Consumption (SFC) for satisfying the torque request in an initial gear and in an alternate gear, and command the transmission to shift from the initial gear into the alternate gear in response to the calculated SFC for satisfying the torque request in the alternate gear being less than the calculated SFC for satisfying the torque request in the initial gear.

In some embodiments, the controller is further configured to calculate an SFC for satisfying the torque request in a second alternate gear. In such embodiments, the controller is additionally configured to command the transmission to shift into the gear corresponding to the least SFC among the calculated SFC for satisfying the torque request in the initial gear, the calculated SFC for satisfying the torque request in the alternate gear, and the calculated SFC for satisfying the torque request in the second alternate gear.

In some embodiments, the controller is further configured to delay a scheduled shift from the initial gear into the alternate gear in response to the calculated SFC for satisfying the torque request in the alternate gear being greater than the calculated SFC for satisfying the torque request in the initial gear. In various embodiments, the alternate gear may be sequentially adjacent to the initial gear, and may be a higher gear or a lower gear than the initial gear.

In some embodiments, the controller is further configured to calculate a ratio of the SFC for satisfying the torque request in the alternate gear to the SFC for satisfying the torque request in the initial gear and store the ratio in a sliding time window array. The controller is additionally configured to calculate a sum of the ratios stored in the sliding time window array, and command the transmission to shift from the initial gear into the alternate gear in response to the sum falling below a predefined threshold. In various embodiments, the transmission may be a step-ratio transmission or a continuously variable transmission.

A method of controlling a transmission according to the present disclosure includes automatically shifting the transmission from an initial gear to a subsequent gear according to a predefined shift schedule in response to a torque request. The method further includes automatically delaying the shifting from the initial gear to the subsequent gear. The automatic delaying of the shift is in response to an SFC for satisfying the torque request in the initial gear being less than an SFC for satisfying the torque request in the subsequent gear.

Some embodiments additionally include automatically shifting from the initial gear to the subsequent gear prior to a predefined shift from the predefined shift schedule. In such embodiments, the automatic shifting is in response to an SFC for satisfying the torque request in the subsequent gear being less than an SFC for satisfying the torque request in the initial gear.

Some embodiments additionally include automatically shifting from the initial gear to the subsequent gear or a second subsequent gear prior to a scheduled shift from the predefined shift schedule. The subsequent gear is a lower gear than the initial gear and the second subsequent gear is a higher gear than the initial gear. In such embodiments, the automatic shifting is based on the least SFC among an SFC for satisfying the torque request in the initial gear, an SFC for satisfying the torque request in the subsequent gear, and an SFC for satisfying the torque request in the second subsequent gear.

A method of controlling a transmission in an automotive vehicle according to the present disclosure includes controlling the transmission according to a predefined shift schedule. The method further includes, in response to a torque request, automatically overriding the shift schedule and controlling the transmission in a gear corresponding to a least value of a current SFC value, a first calculate SFC value, and a second calculated SFC value. The current SFC value corresponds to the initial gear, the first calculated SFC value corresponds to a first alternate gear, and the second calculated SFC value corresponds to a second alternate gear.

In one embodiment, automatically overriding the shift schedule and controlling the transmission in a gear includes commanding a shift into the first alternate gear or second alternate gear earlier than a scheduled shift from the shift schedule. In another embodiment, automatically overriding the shift schedule and controlling the transmission in a gear includes delaying a scheduled shift into the first alternate gear or second alternate gear. In some embodiments, the first alternate gear is higher than and sequentially adjacent to the initial gear and the second alternate gear is lower than and sequentially adjacent to the initial gear. The current SFC value, first calculated SFC value, and second calculated SFC value may be calculated during a current drive cycle based on operating conditions from the current drive cycle.

Embodiments according to the present disclosure provide a number of advantages. For example, vehicles having embodiments according to the present disclosure may override a default shift schedule to shift earlier or later than scheduled based on calculated real-time SFC values. This may provide improved fuel economy relative to existing automotive vehicles.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A step-ratio transmission includes a finite number of selectable gear ratios. Consequently, step-ratio transmissions are generally associated with a shift schedule having a table of desired gear ratios at various operating conditions. Two such gear ratios may be described as sequentially adjacent if, when shifting the transmission in order from a lowest gear to a highest gear or from a highest gear to a lowest gear, the transmission would shift from the first gear ratio to the second gear ratio without any intervening gear ratio. Conventional shift scheduling for an automatic transmission is usually controlled as a function of accelerator pedal position (which may be interpreted as a torque demand input) and transmission output shaft speed or the equivalent vehicle speed. The shift schedule may vary by application or vehicle platform to provide desired drivability, performance, and fuel economy. Drivability is a subjective factor associated with driver expectations with respect to vehicle performance relative to any associated noise, vibration, and harshness (NVH) introduced by the vehicle, engine, and drivetrain. While such shift schedules may be optimized for a variety of factors, due to the pre-defined nature of the shift schedule the shifts may not be optimized for conditions during any particular drive cycle.

Figure 1:
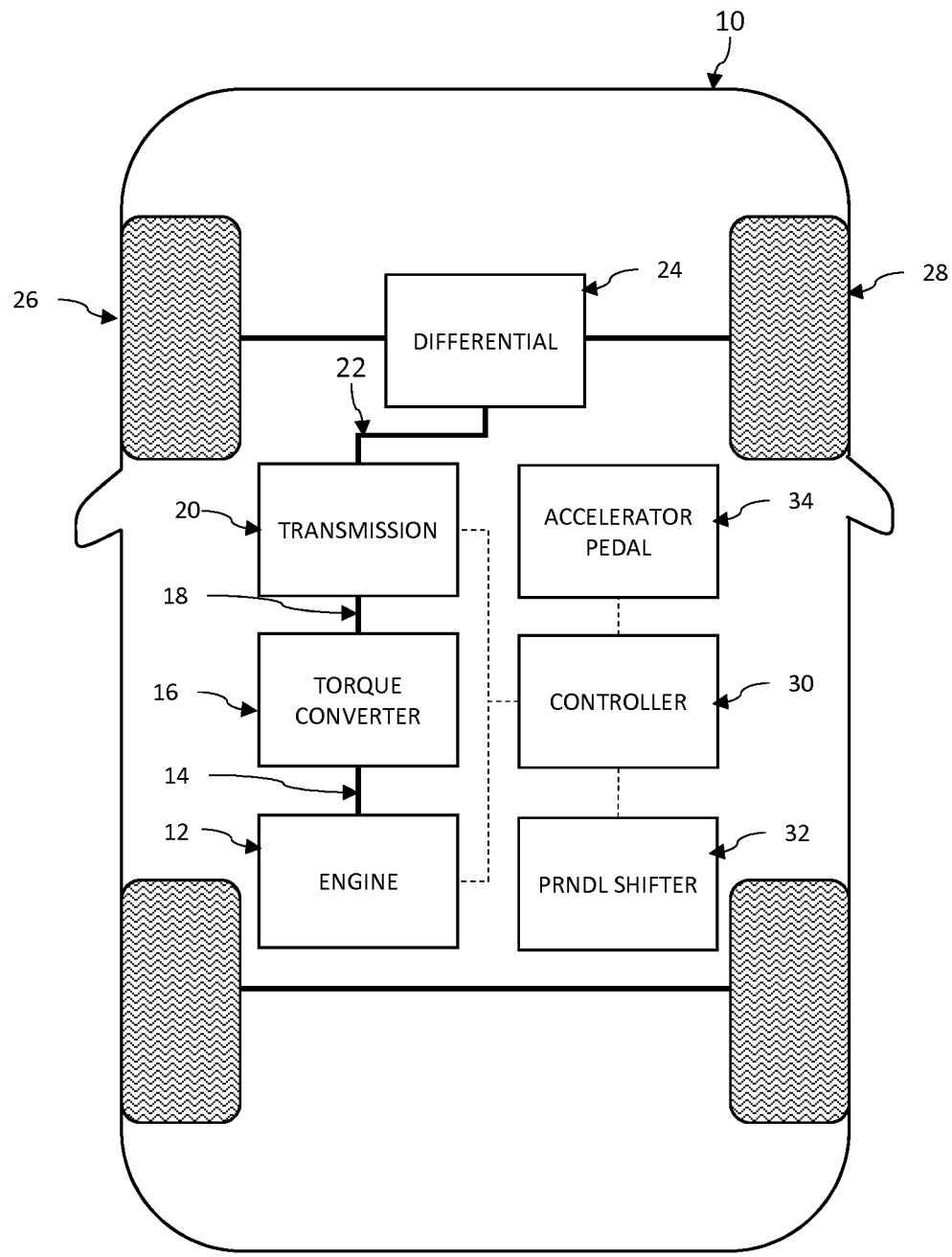
FIG. 1 is a schematic representation of a vehicle according to the present disclosure.

Referring now to FIG. 1, an exemplary vehicle 10 is illustrated in schematic form. The vehicle 10 includes a powertrain with an internal combustion engine 12 configured to, when running, drive a drive shaft 14, which in turn drives a torque converter 16. The torque converter 16 drives an input shaft 18 coupled to a step-ratio automatic transmission 20. The transmission 20 has an output shaft 22 driving a differential 24. The differential 24 multiplies torque and speed output by the transmission by a final drive ratio, changes the axis of rotation by 90 degrees, and divides power between a left wheel 26 and a right wheel 28, permitting slight wheel speed differences as the vehicle turns a corner.

The powertrain is controlled by a controller 30. The controller 30 may be a single micro-processor or may be a number of communicating micro-processors. For example, the controller 30 may include a vehicle system controller, an engine controller, and a transmission controller communicating via a Controller Area Network (CAN). The controller 30 may receive signals from a number of sensors including at least a PRNDL shifter 32 and an accelerator pedal 34.

Based on these signals, the controller 30 determines the magnitude and direction of torque demanded by a driver. The controller 30 controls the torque delivered by the engine by sending signals to the engine to control throttle opening, fuel injection, spark, etc.

As may be seen, the embodiment of FIG. 1 includes a conventional (i.e. non-hybrid) front-wheel drive powertrain. However, the systems and methods discussed in further detail below are not limited to use in such vehicles. Systems and methods according to the present disclosure may also be implemented in hybrid vehicles, vehicles with rear-wheel or four-wheel drive, or any other automotive vehicle having a transmission with multiple selectable gear ratios.

Figure 2:
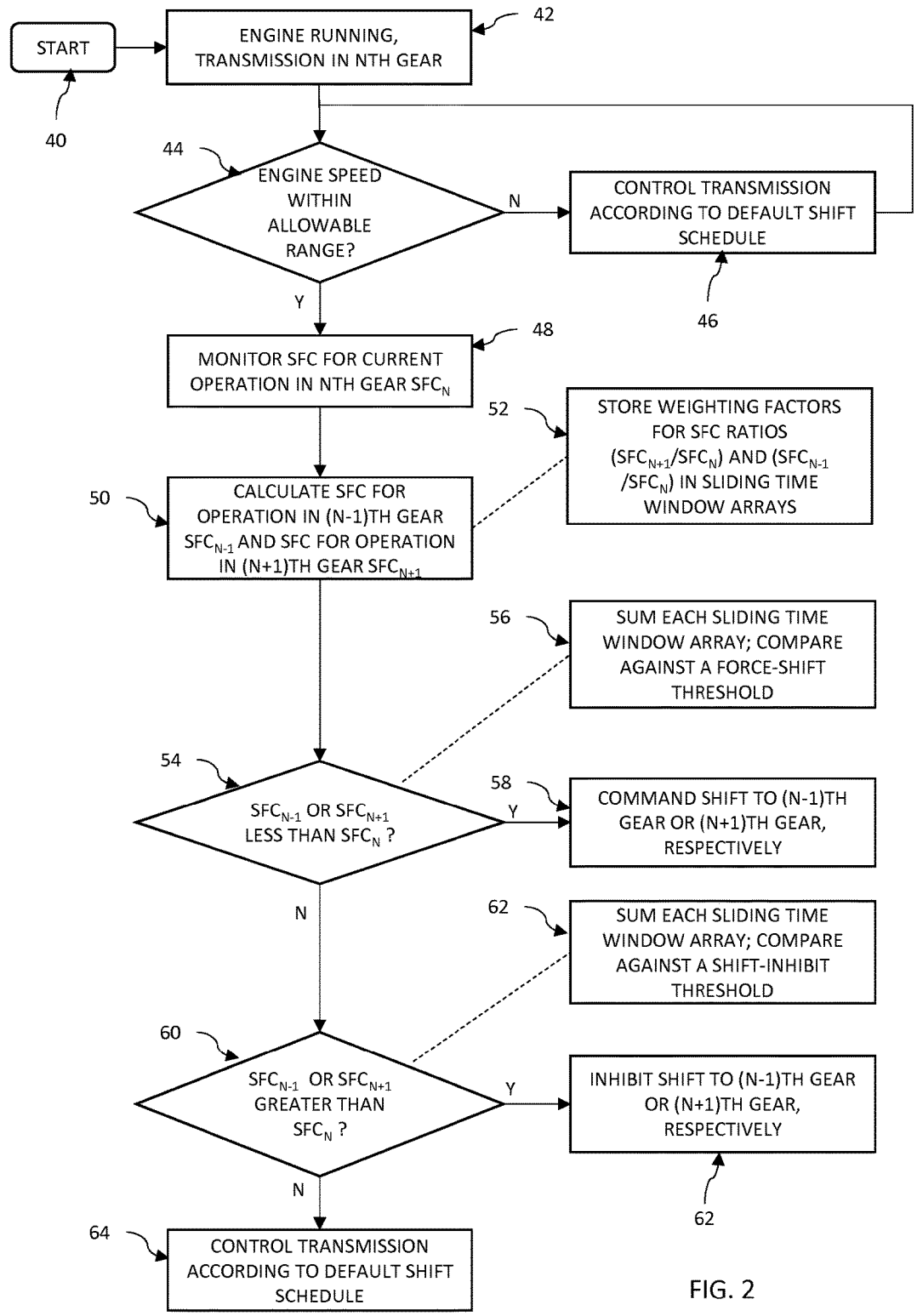
FIG. 2 illustrates a method of controlling a transmission according to the present disclosure in flowchart form.

FIG. 2 illustrates a method of controlling a transmission according to the present disclosure. The method begins at block 40. The internal combustion engine is running and providing power to the input shaft of the transmission, while the transmission is in Nth gear, as illustrated at block 42. Here, Nth gear refers to one of a plurality of selectable sequential gears, e.g. first gear, second gear, third gear, etc. Each sequential gear is distinguished by a step change in torque ratio and speed ratio relative to a previous gear N−1 and a subsequent gear N+1. The transmission is provided with a default shift schedule, which may be generally similar to those known in the art.

A determination is made of whether a current engine speed is within an allowable range, e.g. above a minimum engine speed and below a maximum engine speed, as illustrated at operation 44. At very high or low engine speeds, deviation from the default shift schedule may result in undesirable noise, vibrations, and harshness (NVH). If no, i.e. the engine speed is not within the allowable range, then the transmission is controlled according to the default shift schedule, as illustrated at block 46. Control then returns to operation 44. Thus, the algorithm controls the transmission according to the default shift schedule until the current engine speed is within the allowable range.

If yes, i.e. the current engine speed is within the allowable range, the current specific fuel consumption $SFC_N$ is monitored, as illustrated at block 48. $SFC_N$ corresponds to the fuel consumption for current operation in Nth gear, and may be measured as a brake specific fuel consumption.

The SFC for operation in the adjacent lower gear, (N−1)th gear, and in the adjacent higher gear, (N+1)th gear, are then calculated, as illustrated at block 50. The calculated SFC values may be referred to as $SFC_{N-1}$ and $SFC_{N+1}$, respectively. The calculated SFC values $SFC_{N-1}$ and $SFC_{N+1}$ may be calculated as brake specific fuel consumption, and are preferably calculated based on an assumption of constant power at the wheels and based on the transmission efficiencies at (N−1)th gear and (N+1)th gear, respectively. A method of calculating the values of $SFC_{N-1}$ and $SFC_{N+1}$ will be discussed in further detail below with respect to FIG. 3.

In a preferred embodiment, the calculated values of $SFC_{N-1}$ and $SFC_{N+1}$ are converted to SFC ratios ($SFC_{N-1}/SFC_N$) and ($SFC_{N+1}/SFC_N$), respectively, as illustrated at block 52. The SFC ratios for (N−1)th gear and (N+1)th gear are converted to weight factors and stored in sliding time window arrays. In an exemplary embodiment, the values of $SFC_{N-1}$ and $SFC_{N+1}$ are calculated every 30 milliseconds and the most recent 10 values are stored. Thus, in the exemplary embodiment, the sliding time window arrays for (N−1)th gear and (N+1)th gear include weight factors corresponding to the respective SFC ratios for the previous 300 milliseconds of operation. Of course, other cycle times and array sizes may be used, resulting in different lengths of time stored in the respective arrays.

A determination is then made of whether $SFC_{N-1}$ is less than $SFC_N$, and of whether $SFC_{N+1}$ is less than $SFC_N$, as illustrated at operation 54. If so, then this is indicative that the sequentially lower gear or sequentially higher gear, respectively, may result in more efficient operation.

In some embodiments, the determination of operation 54 may be modified by providing an additional margin, e.g. determining whether $SFC_{N-1}$ is at least 5 percent less than $SFC_N$ and whether $SFC_{N+1}$ is at least 5 percent less than $SFC_N$.

In a preferred embodiment, this comparison includes calculating a first sum of the sliding time window array including the weight factors corresponding to SFC ratios for (N−1)th gear and a second sum of the sliding time window array including the weight factors corresponding to SFC ratios for (N+1)th gear, as illustrated at block 56. The first sum and the second sum are each compared against a calibratable force-shift threshold. If either the first sum for (N−1)th gear or the second sum for (N+1)th gear are below the force-shift threshold, i.e. the sum of the respective SFC ratios is below a threshold value, then the determination of operation 54 is satisfied.

If the determination of operation 54 is satisfied, e.g. either $SFC_{N-1}$ or $SFC_{N+1}$ is less than $SFC_N$, then the transmission is commanded to shift into (N−1)th gear or (N+1)th gear, respectively, as illustrated at block 58. Thus, if shifting into a higher or lower gear would result in more efficient operation than continued operation in the current gear, the default shift schedule is overridden and the transmission is commanded to shift into the more efficient gear.

If the determination of operation 54 is not satisfied, e.g. neither $SFC_{N-1}$ nor $SFC_{N+1}$ is less than $SFC_N$, then a determination is made of whether $SFC_{N-1}$ or $SFC_{N+1}$ are greater than $SFC_N$, as illustrated at operation 60. If so, then this is indicative that the current gear may result in more efficient operation than the sequentially lower gear or sequentially higher gear, respectively.

In some embodiments, the determination of operation 60 may be modified by providing an additional margin, e.g. determining whether $SFC_{N-1}$ is at least 5 percent greater than $SFC_N$ and whether $SFC_{N+1}$ is at least 5 percent greater than $SFC_N$.

In a preferred embodiment, this comparison includes calculating a first sum of the sliding time window array including the weight factors corresponding to SFC ratios for (N−1)th gear and a second sum of the sliding time window array including the weight factors corresponding to SFC ratios for (N+1)th gear, as illustrated at block 62. The first sum is compared against a first calibratable shift-inhibit threshold and the second sum is compared against a second calibratable shift-inhibit threshold. The first and second calibratable shift-inhibit thresholds may be the same or distinct thresholds. If the first sum for (N−1)th gear or the second sum for (N+1)th gear exceed the corresponding force-shift threshold, then the determination of operation 60 is satisfied.

If the determination of operation 60 is satisfied, e.g. either $SFC_{N-1}$ or $SFC_{N+1}$ are greater than $SFC_N$, then the transmission is inhibited from shifting into (N−1)th gear or (N+1)th gear, respectively, as illustrated at block 62. Thus, if operation in the current gear would result in more efficient operation than shifting into a higher or lower gear, the default shift schedule is overridden and the transmission is shifting into higher or lower gears is inhibited.

If the determination of operation 60 is not satisfied, e.g. neither $SFC_{N-1}$ nor $SFC_{N+1}$ is less than $SFC_N$, then the transmission is controlled according to the default shift schedule, as illustrated at block 64.

The algorithm shown in the exemplary embodiment of FIG. 2 may be repeated at regular intervals, e.g. with every CPU cycle of a controller.

As may be seen, the illustrative method shown in FIG. 2 calculates SFC values for higher and lower gears at intervals during a drive cycle, e.g. in real time. If operation in a higher or lower gear would result in more efficient operation, the default shift schedule is overridden and a shift into the more efficient gear is commanded. Similarly, if operation in a higher or lower gear would result in less efficient operation, the default shift schedule is overridden and shifting into the less efficient gears is inhibited.

Figure 3:
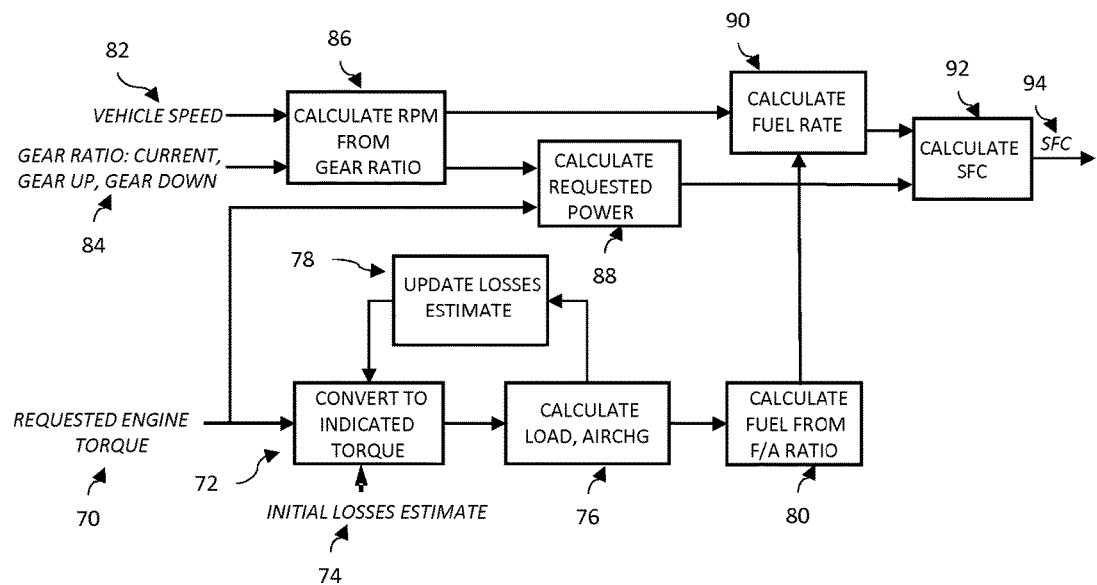
FIG. 3 illustrates a method of calculating specific fuel consumption according to the present disclosure in flowchart form.

Referring now to FIG. 3, a method of calculating SFC at a lower gear (N−1) and a higher gear (N+1) is illustrated. Generally speaking, SFC may be defined as fuel consumption rate divided by power. The power value used in the denominator may include various losses. In a preferred embodiment, all engine and transmission losses are included so that the power is referenced to the transmission output. However, the power value at any point in the drivetrain may be used in other embodiments.

The power value for the SFC estimate may be determined in response to an engine torque request, as illustrated at 70. The engine torque request may originate with the vehicle driver, a cruise control system, an autonomous vehicle control algorithm, or other vehicle system that requests engine or wheel torque. It may be assumed that the requested torque can be met for the transmission settings which are to be compared.

The torque request is then converted to an indicated engine torque, as illustrated at block 72, based on a sum of the requested torque and an initial estimate of losses, illustrated at 74. An engine load, which may be a function of indicated engine torque, and air ingestion quantity are then calculated based on the indicated engine torque, as illustrated at 76. The ingested air may be based on the requested torque and the estimate of engine and transmission losses for conditions matching the selected or an alternate gear. These losses may in turn be based on the engine speed and the engine air ingested. The losses may also be based on other related engine conditions and actuator settings, such as engine intake manifold pressure, intake and exhaust variable valve timing, spark timing (which in turn may be based on measured air temperature, inferred fuel octane, and/or other parameters), turbocharger efficiency, and F/A ratio. The loss estimate is thus recalculated, as illustrated at block 78. This recalculation may be performed based on the engine load calculated at block 76 and/or other appropriate values, such as those discussed above. The algorithm then returns to block 72. In a preferred embodiment, the calculations of blocks 72, 76, and 78 are iterated until the engine load and losses converge within an acceptable value.

A fuel charge is then calculated, as illustrated at block 80. The fuel charge may be calculated based on a multiple of the load and the fuel-to-air (F/A) ratio of the engine combusted or exhausted air and fuel mixture. The F/A ratio of the engine may differ depending on engine operating conditions and regulatory requirements.

A current vehicle speed, illustrated at 82, and current and adjacent gear ratios, illustrated at 84, may be used to calculate engine speeds at the current and adjacent gear ratios, as illustrated at 86.

A requested engine power may then be calculated for the current and adjacent gear ratios, as illustrated at 88, based on the calculated engine speeds and the requested engine torque.

A fuel rate may be calculated for the current and adjacent gear ratios, as illustrated at block 90, based on the fuel charge calculated in block 80, the engine speeds calculated in block 86, and a conversion constant. The fuel rate may be calculated as the product of the fuel charge, the calculated engine speed, and a conversion constant.

The SFC values for the current and adjacent gear ratios may then be calculated as illustrated at block 92 by dividing the fuel rate calculated at block 90 by the requested power calculated at block 88. The algorithm then outputs the calculated SFC value, as illustrated at block 94.

Variants on the above are, of course, possible. For example, in the embodiment shown in FIG. 2, the SFC for the current ratio of a fixed gear transmission is compared to the SFC obtained in adjacent higher and lower ratio gears, providing the powertrain controller with current and predicted fuel consumption values to use in determination of the gear which delivers best fuel economy. However, other embodiments may be practiced in conjunction with a continuously variable transmission, or CVT, which does not have adjacent step-ratio gears. In such an embodiment, preselected sets of engine speed/torque pairs may be used to compute SFC values based on the current value of vehicle speed and pedal position, desired torque at the wheels, and/or other relevant parameters. The SFC at the given set may be computed and the calculated SFC values used to determine whether and in what direction to change the CVT ratio.

As may be seen, the present invention provides a system and method that may include overriding a default transmission schedule to command or delay a shift from a current gear ratio to another gear ratio based on real-time calculated SFC values. This may improve fuel economy relative to existing automotive transmissions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a transmission; and
a controller configured to
receive a torque request,
calculate a ratio of a Specific Fuel Consumption (SFC) for satisfying the torque request in an alternate gear to an SFC for satisfying the torque request in an initial gear,
store the ratio in a sliding time window array,
calculate a sum of ratios stored in the sliding time window array, and
command the transmission to shift from the initial gear into the alternate gear in response to the sum falling below a predefined threshold.

2. The vehicle of claim 1, wherein the alternate gear is a higher gear than the initial gear.

3. The vehicle of claim 1, wherein the alternate gear is sequentially adjacent to the initial gear.

4. The vehicle of claim 1, wherein the controller is further configured to calculate an SFC for satisfying the torque request in a second alternate gear and command the transmission to shift into the gear corresponding to the least SFC among the calculated SFC for satisfying the torque request in the initial gear, the calculated SFC for satisfying the torque request in the alternate gear, and the calculated SFC for satisfying the torque request in the second alternate gear.

5. The vehicle of claim 1, wherein the controller is further configured to delay a scheduled shift from the initial gear into the alternate gear in response to the calculated SFC for satisfying the torque request in the alternate gear being greater than the calculated SFC for satisfying the torque request in the initial gear.

6. The vehicle of claim 1, wherein the transmission is a continuously variable transmission.

7. A method of controlling a transmission comprising:
automatically shifting the transmission from an initial gear to a subsequent gear according to a predefined shift schedule in response to a torque request;
automatically delaying a scheduled shift from the initial gear to the subsequent gear in response to an SFC for satisfying the torque request in the initial gear being less than an SFC for satisfying the torque request in the subsequent gear; and
automatically shifting from the initial gear to the subsequent gear prior to a scheduled shift from the predefined shift schedule, the automatic shifting being in response to an SFC for satisfying the torque request in the subsequent gear being less than an SFC for satisfying the torque request in the initial gear.

8. The method of claim 7, wherein the subsequent gear is a higher gear than the initial gear.

9. The method of claim 7, wherein the subsequent gear is sequentially adjacent to the initial gear.

10. The method of claim 7, further comprising automatically shifting from the initial gear to the subsequent gear or a second subsequent gear prior to a scheduled shift from the predefined shift schedule, the subsequent gear being a lower gear than the initial gear and the second subsequent gear being a higher gear than the initial gear, the automatic shifting being based on the least SFC among an SFC for satisfying the torque request in the initial gear, an SFC for satisfying the torque request in the subsequent gear, and an SFC for satisfying the torque request in the second subsequent gear.

11. A method comprising:
calculating a ratio of an SFC for satisfying a torque request in an alternate gear to an SFC for satisfying the torque request in an initial gear;
storing the ratio in a sliding time window array;
calculating a sum of ratios stored in the sliding time window array; and
commanding a transmission to shift from the initial gear into the alternate gear in response to the sum falling below a predefined threshold.

* * * * *